(12) United States Patent
Wang et al.

(10) Patent No.: US 11,334,974 B2
(45) Date of Patent: May 17, 2022

(54) SYSTEMS, METHODS, AND APPARATUSES FOR IMAGE ARTIFACT CANCELLATION

(71) Applicant: KONINKLIJKE PHILIPS N.V., Eindhoven (NL)

(72) Inventors: Shougang Wang, Ossining, NY (US); Jean-Luc Francois-Marie Robert, Cambridge, MA (US); Hong Liu, Eindhoven (NL); Franciscus Hendrikus Van Heesch, Valkenswaard (NL); Gerardus Henricus Maria Gijsbers, Liempde (NL); John Edward Dean, Stormville, NY (US); Evgeniy Leyvi, Arlington, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 73 days.

(21) Appl. No.: 16/638,797

(22) PCT Filed: Aug. 10, 2018

(86) PCT No.: PCT/EP2018/071720
§ 371 (c)(1),
(2) Date: Feb. 13, 2020

(87) PCT Pub. No.: WO2019/034545
PCT Pub. Date: Feb. 21, 2019

(65) Prior Publication Data
US 2021/0133942 A1    May 6, 2021

Related U.S. Application Data

(60) Provisional application No. 62/546,285, filed on Aug. 16, 2017.

(51) Int. Cl.
*G06T 5/50* (2006.01)
*G06T 7/30* (2017.01)
*G06T 7/70* (2017.01)

(52) U.S. Cl.
CPC .................. *G06T 5/50* (2013.01); *G06T 7/30* (2017.01); *G06T 7/70* (2017.01);
(Continued)

(58) Field of Classification Search
CPC .... G06T 5/50; G06T 7/30; G06T 7/70; G06T 2207/10132; G06T 2207/20216; G06T 2207/20224
(Continued)

(56) References Cited

U.S. PATENT DOCUMENTS 6,443,896 B1    9/2002    Detmer
6,530,885 B1    3/2003    Entrekin et al.
(Continued)

FOREIGN PATENT DOCUMENTS

DE    102016108737 A1    12/2016
EP        3001223 A1      3/2016

OTHER PUBLICATIONS

Kling et al: "Reverberation Reduction in Ultrasonic B-Mode Images via Dual Frequency Image Subtraction"; IEEE Transactions on Medical Imaging, 1993, No. 4, pp. 792-802.
(Continued)

*Primary Examiner* — Amandeep Saini (57) ABSTRACT

Systems, methods, and apparatuses for reducing or eliminating reverberation artifacts in images are disclosed. Systems including one or more ultrasound probes are disclosed. Apparatuses for providing registration information for an ultrasound probe or probes at different positions are disclosed. A method of combining volume images acquired at different positions to reduce or eliminate reverberation artifacts is disclosed.

13 Claims, 7 Drawing Sheets

(52) U.S. Cl.
CPC ............... *G06T 2207/10132* (2013.01); *G06T 2207/20216* (2013.01); *G06T 2207/20224* (2013.01)

(58) Field of Classification Search
USPC ........................................................ 382/275
See application file for complete search history.

(56) References Cited

U.S. PATENT DOCUMENTS

| | | |
|---|---|---|
| 8,105,239 B2 | 1/2012 | Specht |
| 2009/0208079 A1* | 8/2009 | Vaillant .................... G06T 7/30 382/131 |
| 2010/0262013 A1 | 10/2010 | Smith et al. |
| 2013/0204135 A1 | 8/2013 | Kucewicz et al. |
| 2014/0135626 A1 | 5/2014 | Specht |
| 2015/0359512 A1 | 12/2015 | Boctor et al. |

OTHER PUBLICATIONS

Leung et al: "Sparse Registration for Three-Dimensional Stress Echocardiography"; IEEE Transactions on Medical Imaging, vol. 27, No. 11, Nov. 2008, pp. 1568-1579.
PCT/EP2018/071720, Written Opinion * ISR, Oct. 23, 2018, 17 Page Document.
Perperidis: "Postprocessing Approaches for the Improvement of Cardiac Ultrasound B-Mode-Images: A Review"; IEEE Transactions on Ultrasonics, Ferroeletrics, and Frequency Control, vol. 63, No. 3, Mar. 2016.

* cited by examiner

FIG. 7 understand that other embodiments may be utilized and that structural, logical and electrical changes may be made without departing from the spirit and scope of the present disclosure. The following detailed description is, therefore, not to be taken in a limiting sense.

SYSTEMS, METHODS, AND APPARATUSES FOR IMAGE ARTIFACT CANCELLATION

CROSS-REFERENCE TO PRIOR APPLICATIONS

This application is the U.S. National Phase application under 35 U.S.C. §371 of International Application No. PCT/EP2018/071720, filed on Aug. 10, 2018, which claims the benefit of U.S. Provisional Patent Application No. 62/546,285, filed on Aug. 16, 2017. These applications are hereby incorporated by reference herein.

RELATED APPLICATION

This application claims the benefit and priority to U.S. Provisional No. 62/546,285, filed Aug. 16, 2017, which is incorporated by reference in its entirety.

TECHNICAL FIELD

This application is directed to removal of artifacts from volume images. Specifically, this application is directed to removal of artifacts in ultrasound volume images.

BACKGROUND

Ultrasound imaging is used to visualize internal anatomy and help guide invasive devices (e.g., needles, catheters) during medical procedures. Typically, a single ultrasound probe is used to acquire a volume (three dimensional) image of a region of interest in the body. The ultrasound probe may be held by the clinician performing the procedure, an assisting technician, and/or a mechanical apparatus. Even when the ultrasound probe is held in close contact with the patient and is not moved, artifacts may be present in the ultrasound images. Certain invasive devices are strong reflectors of ultrasound waves. The strong reflection may cause reverberation artifacts in the image. These artifacts may impair a clinician's ability to interpret the images or perform the procedure. For example, the reverberation artifact may obscure the view of the mitral valve during a valve replacement procedure. In another example, the reverberation may appear as an extension of the invasive device, making placement of the device difficult.

SUMMARY

The systems, methods, and/or apparatuses described herein may reduce reverberation artifacts when volume images acquired from different coordinate positions are combined. This may provide improved field of view in the combined images. Some embodiments described herein may reduce registration issues when co-registering images from multiple ultrasound probes (e.g., a probe imaging from an apical direction and another probe imaging from a parasternal direction of a patient). In order to register the images acquired from different positions from one or more probes, the method may involve registering the positions (e.g., 3-D coordinates) of the probe or probes. The probe registration may include determining two or more probe coordinates relative to a center of the probe's transducer (e.g. the center of a two dimensional matrix array). With the probe coordinates registered, the system may obtain a volume image from each probe (e.g. interleaved image acquisition from the probes) or from each probe position. The volume image data from each probe position is translated/rotated to align the volume images using the probe registration information. After alignment, an average of the signals from each probe position may be calculated and subtracted. Image values of an object may result in a zero value after subtraction and any non-zero values remaining after the subtraction may be labeled as reverberation artifacts and removed from the combined image.

According to an exemplary embodiment of the disclosure, an ultrasound imaging system may include at least one ultrasound probe configured to obtain at least two volume images, wherein the volume images may comprise coordinate positions and each volume image may be obtained from at least one different coordinate position, and at least one processor that may be configured to: receive the volume images, align the volume images based on the coordinate positions of the volume images, average the aligned volume images to create a combined image, estimate a difference between the aligned volume images, the difference being representative of a reverberation artifact, and remove the estimated difference from the combined image, thereby reducing the reverberation artifact.

According to another exemplary embodiment of the disclosure, a method to reduce reverberation artifacts may include receiving at least two volume images of an object within a subject, wherein the volume images comprise coordinate positions and each volume image is obtained from at least one different coordinate position, aligning a first volume image and a second volume image based on the coordinate positions of the volume images, averaging the aligned volume images to create a combined image, estimating a difference between the aligned volume images, the difference representative of a reverberation artifact; and removing the estimated difference from the combined image, thereby reducing the reverberation artifact.

DETAILED DESCRIPTION

The following description of certain exemplary embodiments is merely exemplary in nature and is in no way intended to limit the invention or its applications or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of certain features will not be discussed when they would be apparent to those with skill in the art so as not to obscure the description of the present system.

According to principles of the disclosure, in preparation for an invasive procedure, two ultrasound probes may be placed in acoustical contact with a patient. The ultrasound probes may be two-dimensional matrix probes capable of three dimensional volume imaging. The ultrasound probes may each be positioned to image a region of interest of the body from different angles. The region of interest may include relevant anatomy (e.g. mitral valve, blood vessel, tissue) and/or an invasive device. Reverberation artifacts from invasive devices are angle dependent, so the reverberation artifact in each probe's volume image will be different. However, the anatomy in each probe's volume image will be the same. As will be described in more detail herein, the volume images from the two ultrasound probes may be combined to eliminate the reverberation artifact from an invasive device and/or other strong reflector. The clean image generated by the combined volume images may be provided to a clinician on a display. This may improve navigation and interpretation of images during invasive procedures.

Figure 1:
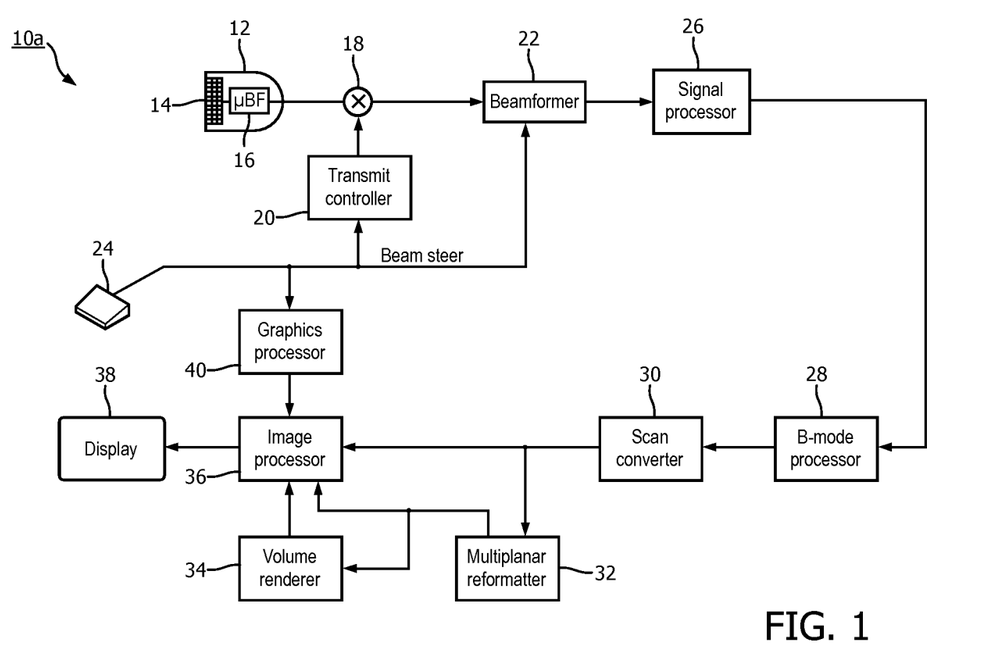
FIG. 1 is a block diagram of an ultrasound imaging system according to an embodiment of the disclosure.

Referring to FIG. 1, an ultrasound imaging system 10*a* constructed in accordance with the principles of the present disclosure is shown in block diagram form. In the ultrasonic diagnostic imaging system of FIG. 1, an ultrasound probe 12 includes a transducer array 14 for transmitting ultrasonic waves and receiving echo information. A variety of transducer arrays are well known in the art, e.g., linear arrays, convex arrays or phased arrays. The transducer array 14, for example, can include a two dimensional array (as shown) of transducer elements capable of scanning in both elevation and azimuth dimensions for 2D and/or 3D imaging. The transducer array 14 is coupled to a microbeamformer 16 in the probe 12 which controls transmission and reception of signals by the transducer elements in the array. In this example, the microbeamformer is coupled by the probe cable to a transmit/receive (T/R) switch 18, which switches between transmission and reception and protects the main beamformer 22 from high energy transmit signals. In some embodiments, the T/R switch 18 and other elements in the system can be included in the transducer probe rather than in a separate ultrasound system base. The transmission of ultrasonic beams from the transducer array 14 under control of the microbeamformer 16 is directed by the transmit controller 20 coupled to the T/R switch 18 and the beamformer 22, which receives input from the user's operation of the user interface or control panel 24. One of the functions controlled by the transmit controller 20 is the direction in which beams are steered. Beams may be steered straight ahead from (orthogonal to) the transducer array, or at different angles for a wider field of view. The partially beamformed signals produced by the microbeamformer 16 are coupled to a main beamformer 22 where partially beamformed signals from individual patches of transducer elements are combined into a fully beamformed signal.

The beamformed signals are coupled to a signal processor 26. The signal processor 26 can process the received echo signals in various ways, such as bandpass filtering, decimation, I and Q component separation, and harmonic signal separation. The signal processor 26 may also perform additional signal enhancement such as speckle reduction, signal compounding, and noise elimination. The processed signals are coupled to a B mode processor 28, which can employ amplitude detection for the imaging of structures in the body. The signals produced by the B mode processor are coupled to a scan converter 30 and a multiplanar reformatter 32. The scan converter 30 arranges the echo signals in the spatial relationship from which they were received in a desired image format. For instance, the scan converter 30 may arrange the echo signal into a two dimensional (2D) sector-shaped format, or a pyramidal three dimensional (3D) image. The multiplanar reformatter 32 can convert echoes which are received from points in a common plane in a volumetric region of the body into an ultrasonic image of that plane, as described in U.S. Pat. No. 6,443,896 (Detmer). A volume renderer 34 converts the echo signals of a 3D data set into a projected 3D image as viewed from a given reference point, e.g., as described in U.S. Pat. No. 6,530,885 (Entrekin et al.) The 2D or 3D images are coupled from the scan converter 30, multiplanar reformatter 32, and volume renderer 34 to an image processor 36 for further enhancement, buffering and temporary storage for display on an image display 38. The graphics processor 36 can generate graphic overlays for display with the ultrasound images. These graphic overlays can contain, e.g., standard identifying information such as patient name, date and time of the image, imaging parameters, and the like. For these purposes the graphics processor receives input from the user interface 24, such as a typed patient name. The user interface can also be coupled to the multiplanar reformatter 32 for selection and control of a display of multiple multiplanar reformatted (MPR) images.

As will be described in detail, an ultrasound imaging system according to principles of the present disclosure may include at least one ultrasound probe configured to obtain at least two volume images acquired at different coordinate positions. The ultrasound imaging system may include at least one processor configured to receive the volume images, align the volume images based on the coordinate positions, average the aligned volume images to create a combined image, estimate a difference between the aligned volume images, and remove the estimated difference from the combined image, thereby reducing reverberation artifacts.

Figure 2:
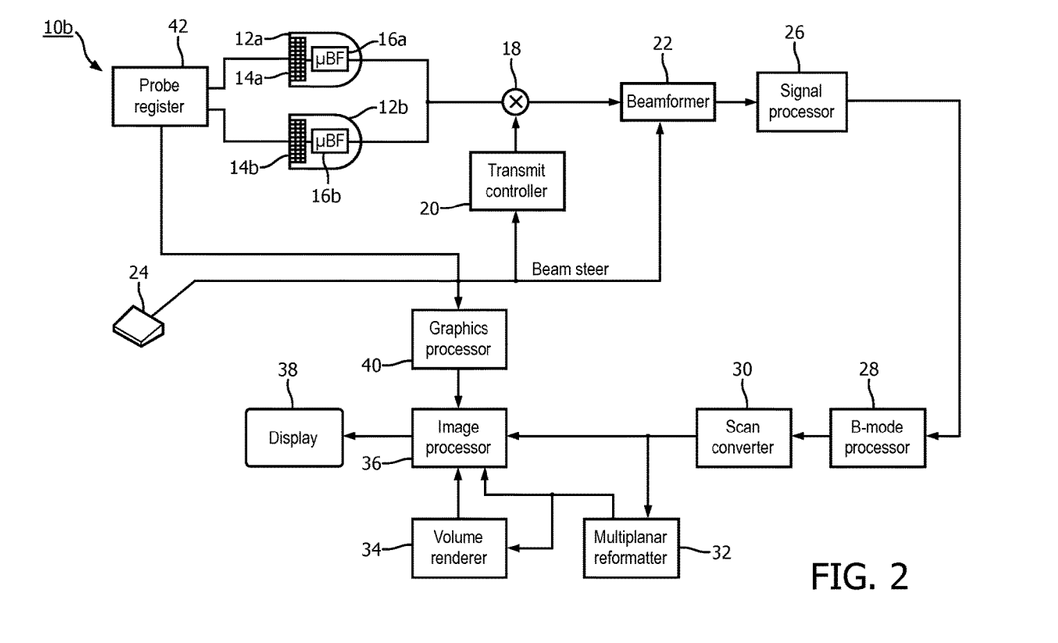
FIG. 2 is a block diagram of an ultrasound imaging system according to an embodiment of the disclosure.

Referring to FIG. 2, an ultrasound imaging system 10*b* constructed in accordance with the principles of the present disclosure is shown in block diagram form. The ultrasound imaging system 10*b* includes all of the components of ultrasound imaging system 10*a* described in reference to FIG. 1. However, ultrasound imaging system 10*b* includes two ultrasound probes 12*a* and 12*b*. Each ultrasound probe 12*a* and 12*b* include transducer arrays 14*a* and 14*b* and microbeam formers 16*a* and 16*b*, respectively. Both ultrasound probes 12*a* and 12*b* are shown coupled to the transmit/receive (T/R) switch 18 in FIG. 2. However, in some embodiments, each ultrasound probe 12*a* 12*b* may include or may be coupled to separate T/R switches, which may both be coupled to the transmit controller 20. Similarly, although one main beamformer 22 is shown in FIG. 2, in some embodiments, a separate beamformer may be coupled to each ultrasound probe 12*a* and 12*b*.

Ultrasound imaging system 10b may include a probe register 42 coupled to the ultrasound probes 12a and 12b. The probe register 42 may register the relative positions (e.g., coordinate positions) of the ultrasound probes 12a and 12b to one another and/or other reference points in three dimensional space. The probe registration information (e.g., angle, orientation, points in space) may be provided by the probe register 42 to the image processor 36 and/or other components of the ultrasound imaging system 10b. In some embodiments, the probe register 42 may be physically coupled to the ultrasound probes 12a and 12b. In other embodiments, the probe register 42 may have no physical contact with the ultrasound probes 12a and 12b. For example, the probe register 42 may optically and/or electromagnetically detect the positions of the ultrasound probes 12a and 12b.

Figure 3:
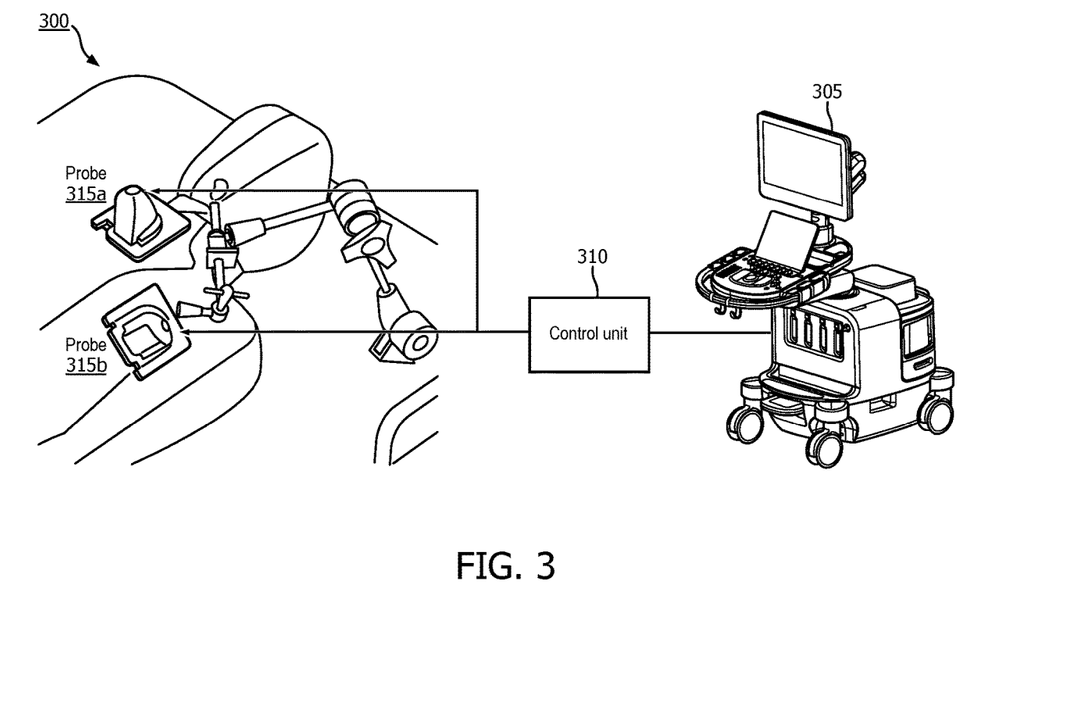
FIG. 3 is a system level diagram of an ultrasound imaging system according to principles of the present disclosure.

FIG. 3 is a system level diagram of an ultrasound imaging system 300 according to principles of the present disclosure. The ultrasound imaging system 10b of FIG. 2 had integrated components to operate two ultrasound probes. In contrast, the ultrasound imaging system in FIG. 3 shows an ultrasound system 305 coupled to an external control unit 310 to control two separate ultrasound probes 315a and 315b. The external control unit 310 may include one or more probe register, T/R switches, beamformers, and/or transmit controller 20. The ultrasound system 305 may communicate with the external control unit 310 to acquire images from the two separate ultrasound probes 315a and 315b. The use of an external control unit may be desirable when adapting a pre-existing ultrasound imaging system to operate according to principles of the present disclosure. The use of an external control unit may also be desirable if additional components are controlled by the ultrasound system 305 (e.g., robotic arms, microscribes).

Figure 4:
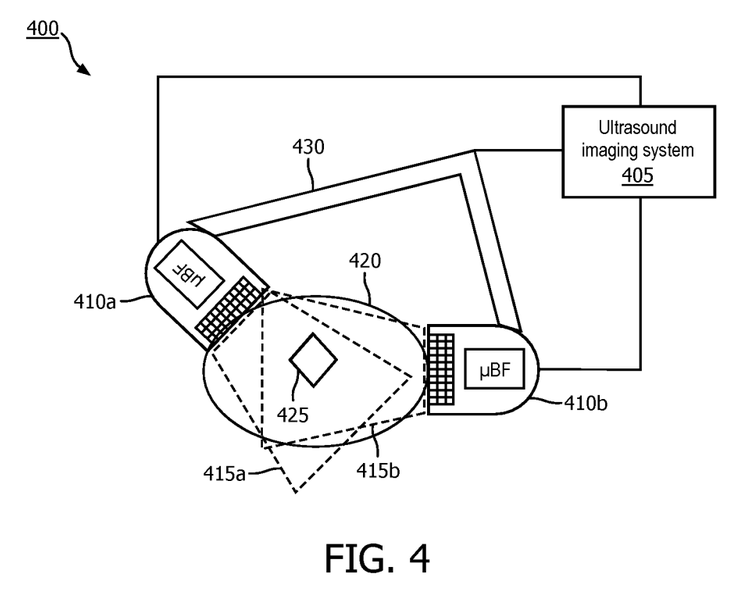
FIG. 4 is a block diagram of an example ultrasound probe set-up according to principles of the disclosure.

As previously mentioned, reverberation artifacts are angle dependent. That is, the location and appearance of a reverberation artifact caused by a strong reflector (e.g., an interventional device), will vary based on the location and orientation of the ultrasound probe. Accordingly, when the same volume is imaged by two ultrasound probes at different coordinate positions, the reverberation artifact from the same reflector will appear differently in the volume image of each ultrasound probe. FIG. 4 is a block diagram 400 of an example ultrasound probe set-up according to principles of the disclosure. Ultrasound imaging system 405 includes ultrasound probes 410a and 410b. The ultrasound probes 410a and 410b are placed in acoustical contact with a subject (e.g., patient) 420 at different positions. Dotted regions 415a and 415b represent approximate volumes imaged by ultrasound probes 410a and 410b, respectively. Within a common volume (e.g., region of interest) imaged by both ultrasound probes 410a and 410b, an object 425 may be imaged along with the surrounding anatomy of the subject 420. The object 425 may be an interventional device in some embodiments.

In some embodiments, the ultrasound probes 410a and 410b may be held in position by mechanical arms 430. In some embodiments, the mechanical arms 430 may be implemented by metal poles and clamps. Although the mechanical arms 430 are shown in an L-shape, the mechanical arms 430 could be in other configurations. For example, mechanical arms 430 could form a U-shape, a T-shape, or I-shape. In some embodiments, mechanical arms 430 could be implemented as a single mechanical arm holding both ultrasound probes 410a and 410b. In some embodiments, mechanical arms 430 may have one or more articulated joints that may provide for adjustable positioning of the ultrasound probes 410a and 410b.

In some embodiments, the mechanical arms 430 may include a probe register (e.g., probe register 42 in FIG. 2). The mechanical arm 430 may be communicatively coupled to the ultrasound imaging system 405 to provide the probe registration information and/or receive instructions from the ultrasound imaging system 405. For example, in some embodiments, the mechanical arms 430 may be robotic arms that include actuators and/or sensors that provide probe registration information to the ultrasound system 405. In some embodiments, movement of the robotic arms and/or other functions of the robotic arms may be controlled by the ultrasound imaging system 405 and/or an external robotic control system. In some embodiments, the probe register may be independent of the mechanical arms 430. In some embodiments, the mechanical arms 430 may be omitted. For example, an ultrasound technician may hold the ultrasound probes 410a and 410b in position. In another example, the ultrasound probes 410a and 410b may be attached to the subject 420 by a strap or an adhesive.

Figure 5:
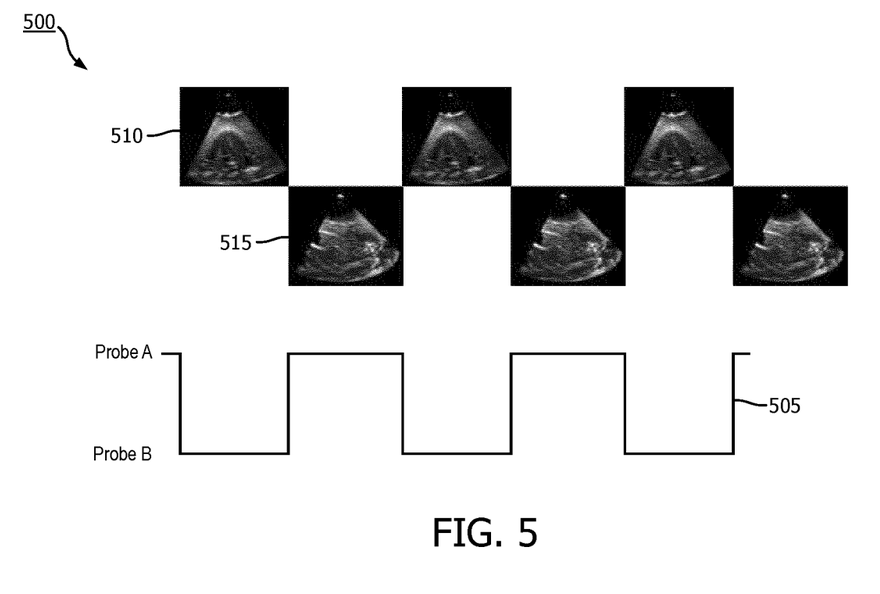
FIG. 5 is a diagram of acquiring images in an interleaved manner according to principles of the disclosure.

Whether control functions are integrated into an ultrasound imaging system as shown in FIG. 2 or are external as shown in FIG. 3, the ultrasound imaging system may receive signals from both ultrasound probes for analysis. The ultrasound imaging system may receive a complete volume scan from a first probe and then a complete volume scan from the second probe. Scans may be repeated in an interleaved manner 500 as illustrated in FIG. 5. Line 505 illustrates which ultrasound probe is currently acquiring a volume. In the example shown in FIG. 5, when Line 505 is high, a volume is acquired from Probe A, and when Line 505 is low, a volume is acquired from Probe B. Images 510 represent volumes acquired by Probe B and images 515 represent volumes acquired by Probe A. Rather than alternating acquisitions of entire volumes, scans of the volumes from the two probes may be interleaved on a per slice basis or per beam basis. Other divisions of signal acquisition from the two probes may also be possible (e.g., per patch, per sub-volume unit).

Once the two ultrasound images of the volume are acquired, they may be combined to eliminate the reverberation artifact. The common signals in the two images of the volume correspond to the "true" image whereas the different signals in the two images correspond to the reverberation artifact. In order to combine the volume images, the volume images are aligned. That is, the volume images are be adjusted such that the locations of anatomy and/or other objects in the volume images correspond. To align the volume images from the two ultrasound probes, the relative positions of the two probes may be determined. This may be achieved by a probe register, such as probe register 42 shown in FIG. 2. In some embodiments, a probe register may include a mechanical probe holder coupled to a microscribe. The probe holder may be configured to maintain a constant orientation with the probe. Thus, the relationship between the probe holder and the transducer array of the probe (e.g., center point of array, angle of array) may be determined. Measurements of the mechanical probe holders by one or more microscribes may be used to generate a transformation matrix to correlate the volume images acquired by the two probes.

The probe register is not limited to mechanical systems such as microscribes and robotic arms as discussed above. For example, the ultrasound transducer probes may include electromagnetic tracking tags that allow an electromagnetic tracking system to determine the registration information of the ultrasound probes (e.g., direction, angle, location in space). An example of an electromagnetic tracking system is the PercuNav System. However, other electromagnetic tracking systems may be used. In some embodiments, visible or infrared cameras positioned around the subject may register the locations of the ultrasound probes. In another example, optical scanning of the subject and probes may register the locations of the ultrasound probes. In a further example, a technician may manually input the locations and positions of the ultrasound probes into the ultrasound imaging system, which may then calculate a transformation matrix.

Figure 6:
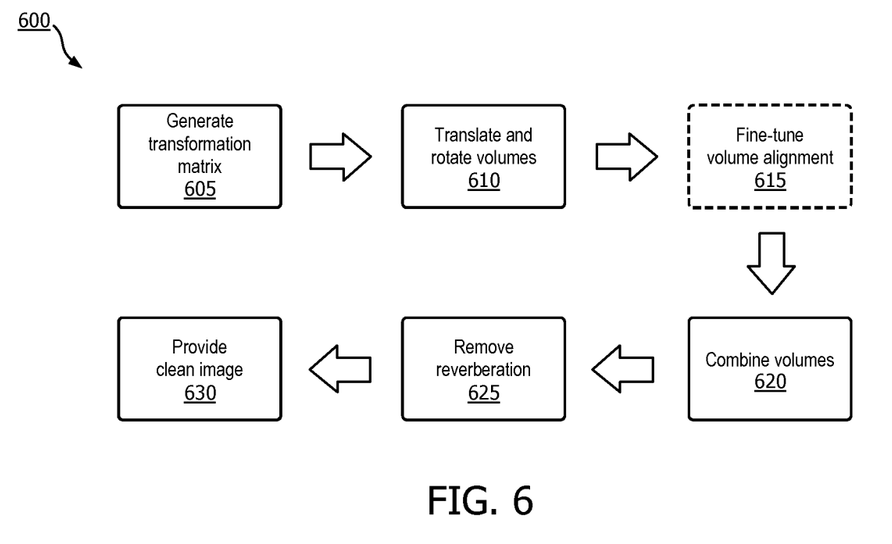
FIG. 6 is a block diagram of a method that may be performed by an image processor according to embodiments of the disclosure.

The volume images acquired by the two probes and the probe registration information for the two probes may be received by an image processor of an ultrasound imaging system, for example, image processor 36 shown in FIG. 2. FIG. 6 is a block diagram of a method 600 that may be performed by the image processor according to embodiments of the disclosure. At Step 605, the image processor may generate a transformation matrix, based at least in part, on the registration information (e.g., coordinate positions or simply positions) of the two ultrasound probes. The registration information may have been provided by a probe register, such as probe register 42 shown in FIG. 2. A transformation matrix is a two-dimensional matrix used to "transform" a three dimensional volume (e.g., volume image). Example transformations of a volume include, but are not limited to, translating the volume in space (e.g., move the volume to another location), rotating the volume in space (e.g., change the angle of the volume), and/or scaling the volume in space (e.g., make the volume larger or smaller).

At Step 610, the image processor may rotate and translate the volume images based at least in part on the transformation matrix. The 2-D transformation matrix is multiplied by a one-dimensional matrix comprising the X, Y, and Z coordinates of a voxel of a volume image. Each voxel of the volume image is multiplied by the transformation matrix to rotate, translate, and/or scale the volume image as desired. In the embodiments described herein, the volume images are rotated, translated, and/or scaled to align the volume images acquired by the two ultrasound probes. In some embodiments, one of the volume images acquired by one of the ultrasound probes is selected as a reference volume. The transformation matrix is calculated based at least in part, on the reference volume and the probe registration information and the second volume image acquired by the second ultrasound probe is multiplied by the transformation matrix to align the second volume image with the first volume image. In some embodiments, a reference volume independent of the two volume images is used along with the probe registration information to calculate the transformation matrix and both the first and second volume images are multiplied by the transformation matrix to align the two volume images. In some embodiments, separate transformation matrices may be calculated based on the reference volume and probe registration information and each volume image is multiplied by the respective transformation matrix to align the two volume images.

In an ideal system, the transformation matrix of Step 610 would provide an exact alignment of the two volume images acquired by the ultrasound probes. However, ultrasound signals may be refracted or otherwise distorted traveling through non-homogenous media (e.g., tissue). These distortions may reduce the accuracy of the resulting alignment calculated by the transformation matrix. In some instances, this reduced accuracy may be unacceptable. In these situations, a second alignment may be performed to "fine tune" the alignment at Step 615. Fine tuning may be accomplished by selecting three or more common points within the two volume images and calculating an additional "fine tuning" transformation matrix to align the common points. The fine tuning transformation matrix is then applied to improve the alignment of the two volume images. In some embodiments, the image processor may apply feature recognition algorithms to automatically select the common points within the volumes. In another embodiment, a user may manually select the common points within the volume images.

In some embodiments, fiducials or other markers may be used to provide the common points. Fiducials are often spheres or disks that are configured to be detected by an ultrasound imaging system and/or electromagnetic tracking systems. Some fiducials may be configured to be detected by optical systems. The fiducials may be placed in various locations including, but not limited to, the skin of the subject, a surface in contact with the subject, an implantable device, and/or an interventional device. In some embodiments, the image processor may detect positions of the fiducials in the volume images. In some embodiments, an electromagnetic tracking system and/or other fiducial tracking system may provide fiducial location information to the image processor for use as the three or more common points within the two volume images.

The aligned volume images are then combined at Step 620. The common values in the volume images represent the anatomical features and/or objects scanned within the volume. The values that are different between the two volume images represent the reverberation artifact generated by a strong reflector (e.g., interventional device). In other words, when the first image volume is subtracted from the second volume image, voxels with zero values may be voxels containing the anatomical features and/or objects scanned. The voxels with non-zero values may contain the reverberation artifact. The reverberation artifact is removed at Step 625. In some embodiments, the combined volume images may be divided in half and then the absolute value of the difference between the volume images is subtracted to remove the reverberation. That is, a mean value of the volume images and a value of a difference between the volume images may be computed. This process is summarized in Equation 1:

$$\text{Reverberation Cancellation} = (V_A + V_B)/2 - ABS(V_A - V_B) \quad \text{Equation 1}$$

Where $V_A$ and $V_B$ represent the aligned volume images acquired by the two ultrasound probes. After the reverberation artifact is removed from the combined volume images, a clean image of the volume is provided at Step 630. The image may be provided to a display, such as display 38 shown in FIG. 2.

Figure 7:
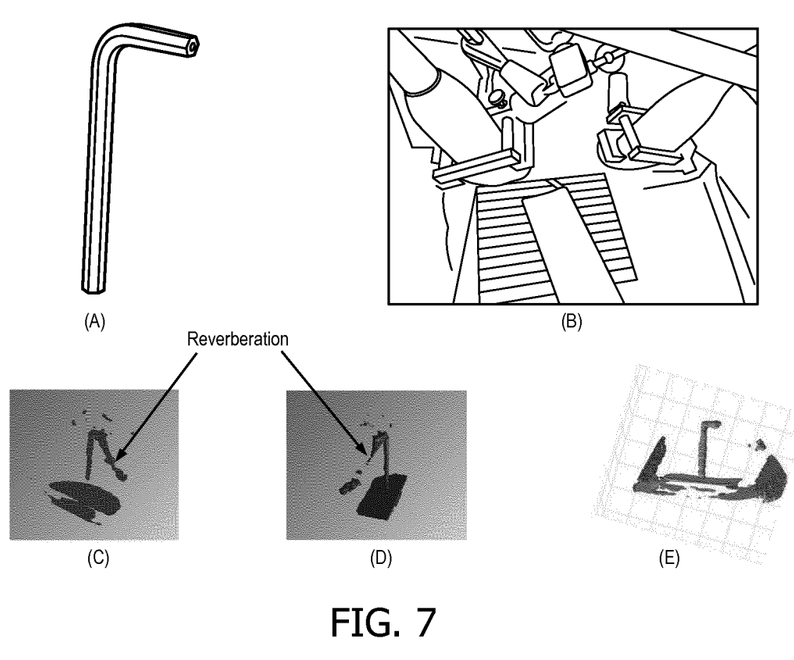
FIGS. 7A, 7B, 7C, 7D and 7E illustrate an example reverberation cancellation procedure according to embodiments of the present disclosure.

FIGS. 7A-E illustrate an example reverberation cancellation procedure according to embodiments of the present disclosure. FIG. 7A shows an Allen wrench (e.g., hex key), which was imaged by two ultrasound probes. FIG. 7B shows two Philips x5-1 ultrasound probes held in probe holders coupled to a microscribe to register the positions of the probes. FIG. 7C is an image of the Allen wrench in a 3D volume acquired by the first ultrasound probe. FIG. 7D is an image of the Allen wrench in a 3D volume acquired by the second ultrasound probe. The reverberation artifact is indicated by an arrow in each image. Note that the actual location of the tip of the Allen wrench is obscured by the reverberation artifact, which may be similar to how the tip of a catheter may be obscured during an invasive procedure.

FIG. 7E is an image of the Allen wrench in the aligned combined volumes with the reverberation artifact removed. The tip of the Allen wrench can now be more clearly observed.

Although the reduction of reverberation artifacts has been described in reference to using two or more ultrasound probes in FIGS. 2-7, the principles of the present disclosure may be applied to an ultrasound imaging system including only a single ultrasound probe. For example, in FIG. 2, ultrasound probe 12b may be eliminated. The single ultrasound probe 12a may be moved to different positions between acquisition of the volume images and the probe register 42 may acquire the position of the ultrasound probe 12a for each acquisition for alignment of the volume images. The ultrasound probe 12a may be moved by a user, a robotic arm, and/or other translation means (e.g., mechanical lever).

Thus, similar to method 600 described in reference to FIG. 6, the ultrasound imaging system in FIG. 2 including either one more probes may be capable of performing a method of receiving at least two volume images and each volume image is obtained from different coordinate positions, aligning the volume images based on the coordinate positions of the volume images, averaging the aligned volume images to create a combined image, estimating a difference between the aligned volume images, and removing the estimated difference from the combined image.

Although the present system has been described with reference to an ultrasound imaging system, the present system may be extended to other ultrasound transducers. Additionally, the present system may be used to obtain and/or record image information related to, but not limited to renal, testicular, prostate, breast, ovarian, uterine, thyroid, hepatic, lung, musculoskeletal, splenic, nervous, cardiac, arterial and vascular systems, as well as other imaging applications related to ultrasound-guided interventions and other interventions which may be guided by real-time medical imaging. Further, the present system may also include one or more elements which may be used with non-ultrasound imaging systems with or without real-time imaging components so that they may provide features and advantages of the present system.

Further, the present methods, systems, and apparatuses may be applied to existing imaging systems such as, for example, ultrasonic imaging systems. Suitable ultrasonic imaging systems may include a Philips® ultrasound system which may, for example, support a conventional broadband linear array transducer that may be suitable for small-parts imaging.

Certain additional advantages and features of this invention may be apparent to those skilled in the art upon studying the disclosure, or may be experienced by persons employing the novel system and method of the present invention, chief of which is reduction of image artifacts by ultrasound imaging systems and method of operation thereof is provided. Another advantage of the present systems and method is that conventional medical imaging systems may be easily upgraded to incorporate the features and advantages of the present systems, devices, and methods.

Of course, it is to be appreciated that any one of the above embodiments or processes may be combined with one or more other embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An ultrasound imaging system comprising.
at least one ultrasound probe configured to obtain at least two volume images, wherein the volume images comprises coordinate positions and each volume image is obtained from at least one different coordinate position; and
at least one processor configured to:
receive the volume images;
align the volume images with a first transformation matrix calculated based on the coordinate positions of the volume images;
align the volume images further with a second transformation matrix calculated based at least in part, on at least three points common to the volume images;
average the aligned volume images to create a combined image;
estimate a difference between the aligned volume images, the difference being representative of a reverberation artifact; and
remove the estimated difference from the combined image, thereby reducing the reverberation artifact.

2. The ultrasound imaging system of claim 1, wherein the difference comprises an absolute value of a difference between the first and second volume images.

3. The ultrasound imaging system of claim 1, wherein the average comprises obtaining a mean value of the volume images.

4. The ultrasound imaging system of claim 1, further comprising a probe register configured to determine a position of the at least one ultrasound probe in order to determine the coordinate positions of the volume images.

5. The ultrasound imaging system of claim 4, wherein the probe register includes at least one of an electromagnetic tracking system, a robotic arm, and an optical detection system.

6. The ultrasound imaging system of claim 1, wherein the at least three points are selected by the processor based on feature recognition.

7. The ultrasound imaging system of claim 1, wherein the at least three points are selected by the processor based on fiducials.

8. The ultrasound imaging system of claim 1, wherein the at least three points are selected by a user.

9. The ultrasound imaging system of claim 1, wherein the ultrasound imaging system includes an external control unit configured to control the at least one ultrasound probe.

10. A method to reduce reverberation artifacts, comprising:
receiving at least two volume images of an object within a subject, wherein the volume images comprise coordinate positions and each volume image is obtained from at least one different coordinate position;
aligning a first volume image and a second volume image with a transformation matrix calculated based on the coordinate positions of the volume images;

calculating a fine tuning transformation matrix, based at least in part, on at least three points common to the first volume image and the second volume image: and further aligning the first volume image and the second volume image, based at least in part, on the fine tuning transformation matrix;

averaging the aligned volume images to create a combined image;

estimating a difference between the aligned volume images, the difference representative of a reverberation artifact; and removing the estimated difference from the combined image, thereby reducing the reverberation artifact.

11. The method of claim 10, wherein estimating the difference comprises an absolute value of a difference between the first and second volume images.

12. The method of claim 10, wherein averaging comprises obtaining a mean value of the volume images.

13. The method of claim 10, wherein the transformation matrix is calculated using a third volume as a reference volume image.

* * * * *